United States Patent [19]

Ono et al.

[11] Patent Number: 4,861,736
[45] Date of Patent: Aug. 29, 1989

[54] SEMICONDUCTIVE CERAMIC COMPOSITION

[75] Inventors: Shuichi Ono; Masahiro Yahagi; Shuichi Itagaki; Nobuaki Kikuchi, all of Akita, Japan

[73] Assignee: TDK Corporation, Tokyo, Japan

[21] Appl. No.: 82,688

[22] Filed: Aug. 4, 1987

[30] Foreign Application Priority Data

Aug. 11, 1986 [JP] Japan .................. 61-186930
Feb. 25, 1987 [JP] Japan ................... 62-40429
Feb. 25, 1987 [JP] Japan ................... 62-40430
Feb. 25, 1987 [JP] Japan ................... 62-40431

[51] Int. Cl.$^4$ ............................................ C04B 35/46
[52] U.S. Cl. ................................. 501/137; 501/138; 501/139
[58] Field of Search ................ 501/137, 138, 139; 252/62.9

[56] References Cited

U.S. PATENT DOCUMENTS 4,014,707  3/1977  Tanaka et al. ..................... 252/520

FOREIGN PATENT DOCUMENTS 1592107   6/1970   France ................... 501/137
52-070398  6/1977  Japan ................... 501/137
52-070398  6/1977  Japan .
57-128903  8/1982  Japan .
57-208003 12/1982  Japan .
58-015078  1/1983  Japan .
61-099207  5/1986  Japan .

Primary Examiner—William R. Dixon, Jr.
Assistant Examiner—Anthony J. Green
Attorney, Agent, or Firm—Oblon, Spivak, McClelland, Maier & Neustadt

[57] ABSTRACT

A semiconductive ceramic composition for a reduction reoxidation type semiconductive ceramic capacitor capable of increasing capacitor, dielectric strength of the capacitor and improving temperature characteristics of the capacitor. The composition includes a $BaTIO_3$ base component and a minor component consisting of Nb and Ce. Nb and Ce are present in amounts of 0.2 to 3.0 mol % on $Nb_2O_5$ and $CeO_2$ bases. Addition of Co and the like increases insulation resistance and D.C. breakdown voltage of the capacitor and further improves temperature characteristics of the capacitor.

14 Claims, No Drawings

SEMICONDUCTIVE CERAMIC COMPOSITION

BACKGROUND OF THE INVENTION

1. Field of the Invention

This invention relates to a semiconductive ceramic composition for a semiconductive ceramic capacitor, and more particularly to a semiconductive ceramic composition suitable for use for manufacturing of a reduction and reoxidation type semiconductive ceramic capacitor.

2. Description of the Prior Art

A semiconductive ceramic capacitor serving as a passive electronic circuit element is generally classified into two types or a boundary-layer type and a surface-layer type. The boundary-layer type semiconductive ceramic capacitor includes a boundary insulation type one and the surface-layer type semiconductive ceramic capacitor includes a barrier-layer type one and a reduction reoxidation type one.

The semiconductive ceramic capacitor, particularly, reduction reoxidation type semiconductive ceramic capacitor generally has a disadvantage that an increase in unit area capacity expressed at uF/cm$^2$ causes a significant decrease in breakdown voltage, resulting in an increase in dielectric loss and/or deterioration of temperature characteristics.

SUMMARY OF THE INVENTION

The present invention has been made in view of the foregoing disadvantage of the prior art.

Accordingly, it is an object of the present invention to provide a semiconductive ceramic composition for a semiconductive ceramic capacitor which is capable of causing the capacitor to exhibit not only increased unit area capacity but increased dielectric strength and excellent temperature characteristics.

It is another object of the present invention to provide a semiconductive ceramic composition for a semiconductive ceramic capacitor which is capable of improving insulation resistance and D.C. breakdown voltage of the capacitor.

It is a further object of the present invention to provide a semiconductive ceramic composition for a reduction reoxidation type semiconductive ceramic capacitor which is capable of causing the capacitor to exhibit not only increased unit area capacity but increased dielectric strength and excellent temperature characteristics.

It is still another object of the present invention to provide a semiconductive ceramic composition for a reduction reoxidation type semiconductive ceramic capacitor which is capable of improving insulation resistance and D.C. breakdown voltage of the capacitor.

In accordance with the present invention, a semiconductive ceramic composition is provided. The composition comprises a BaTiO$_3$ base component and a minor component comprising Nb and Ce. Nb and Ce are present at 0.2 to 3.0 mol % on Nb$_2$O$_5$ and CeO$_2$ bases, respectively.

In accordance with the present invention, a semiconductive ceramic composition is also provided which comprises a BaTiO$_3$ base component, a minor component comprising Nb and Ce, and an additive component comprising Co, Mn, SiO$_2$ and SrTiO$_3$. Nb and Ce are present at 0.2 to 3.0 mol % on Nb$_2$O$_5$ and CeO$_2$ bases, respectively. Co and Mn are present at 0.8 wt % or less and 0.25 wt % or less on Co$_3$O$_4$ and MnCO$_3$ bases, respectively. SiO$_2$ and SrTiO$_3$ are present in amounts of 0.25 wt % or less and 0.5 to 20.0 wt %. The additive component may comprise Co. Mn. SiO$_2$ and CaTiO$_3$, wherein Co, Mn and SiO$_2$ may be present in the same amounts as described above. CaTiO$_3$ may be present at 0.2 to 15.0 wt %. Alternatively, the additive component may comprise Co, Mn, SiO$_2$ and Y. Co, Mn and SiO$_2$ may be present in the same amounts as described above. Y may be present at 0.1 to 3.0 wt % on a Y$_2$O$_3$ basis.

DETAILED DESCRIPTION OF THE INVENTION

The present invention is directed to a semiconductive ceramic composition for a semiconductive ceramic capacitor, particularly, a reduction reoxidation type semiconductive ceramic capacitor which comprises a BaTiO$_3$ base component and a minor component comprising Nb and Ce. The term "minor component" used herein indicates an essential component smaller in quantity than the base component. Nb and Ce constituting the minor component are present in amounts of 0.2 to 3.0 wt % based on Nb$_2$O$_5$ and CeO$_2$ bases, respectively. It was found that use of the composition of such construction for a semiconductive ceramic capacitor, particularly, a reduction and reoxidation type one causes the capacitor to be significantly increased in capacity and dielectric strength and effectively exhibit good temperature characteristics. The composition may also contain Co in an amount of 0.8 wt % or less on a Co$_3$O$_4$ basis. Such addition of Co significantly improves insulation resistance and D.C. breakdown voltage of the capacitor and causes it to exhibit more temperature characteristics. Further, the composition may contain Mn in an amount of 0.25 wt % or less on a MnCO$_3$ basis. In addition, it may contain SiO$_2$ in an amount of 0.25 wt % or less. Incorporation of Mn and SiO$_2$ further promotes the above-noted advantage obtained due to addition of Co.

The present invention is also directed to a semiconductive ceramic composition for a semiconductive ceramic capacitor, particularly, a reduction reoxidation type semiconductive ceramic capacitor which comprises a BaTiO$_3$ base component, a minor component comprising Nb and Ce, and an additive component comprising Co, Mn, SiO$_2$ and SrTiO$_3$. Nb and Ce are present in amounts of 0.2 to 3.0 mol % on Nb$_2$O$_5$ and CeO$_2$ bases, respectively. Co and Mn are present in amounts of 0.8 wt % or less and 0.25 wt % or less on Co$_3$O$_4$ and MnCO$_3$ bases, respectively. SiO$_2$ and SrTiO$_3$ are present in amounts of 0.25 wt % or less and 0.5 to 20.0 wt %, respectively.

Use of the so-formulated composition for a semiconductive ceramic capacitor, particularly, a reduction and reoxidation type one likewise causes the capacitor to be substantially increased in capacity and dielectric strength and positively exhibit good temperature characteristics.

The composition may further contain Y, which may be present in an amount of 0.1 to 3.0 wt % on a Y$_2$O$_3$ basis. Addition of Y causes the capacitor to exhibit improved insulation resistance and D.C. breakdown voltage and more temperature characteristics.

The present invention is further directed to a semiconductive ceramic composition for a semiconductive ceramic capacitor, particularly, a reduction reoxidation type semiconductive ceramic capacitor which comprises a BaTiO$_3$ base component, a minor component comprising Nb and Ce, and an additive component comprising Co, Mn, $SiO_2$ and $CaTiO_3$. Nb and Ce are present in amounts of 0.2 to 3.0 mol % on $Nb_2O_5$ and $CeO_2$ bases, respectively. Co and Mn are present in amounts of 0.8 wt % or less and 0.25 wt % or less on $Co_3O_4$ and $MnCO_3$ bases, respectively. $SiO_2$ and $CaTiO_3$ are present in amounts of 0.25 wt % or less and 0.2 to 15.0 wt %, respectively.

Use of the so-formulated composition for a semiconductive ceramic capacitor, particularly, a reduction and reoxidation type one likewise causes the capacitor to be increased in capacity and dielectric strength and exhibit good temperature characteristics.

The composition may further contain Y, which may be present in an amount of 0.1 to 3.0 wt % on a $Y_2O_3$ basis. Addition of Y causes the capacitor to exhibit improved insulation resistance and D.C. breakdown voltage and more temperature characteristics.

Furthermore, the present invention is directed to a semiconductive ceramic composition for a semiconductive ceramic capacitor, particularly, a reduction reoxidation type semiconductive ceramic capacitor which comprises a $BaTiO_3$ base component, a minor component comprising Nb and Ce, and an additive component comprising Co, Mn, $SiO_2$ and Y. Nb and Ce are present in amounts of 0.2 to 3.0 mol % on $Nb_2O_5$ and $CeO_2$ bases, respectively. Co and Mn are present in amounts of 0.8 wt % or less and 0.25 wt % or less on $Co_3O_4$ and $MnCO_3$ bases, respectively. $SiO_2$ is present in an amount of 0.25 wt % or less and Y is present in an amount of 0.1 to 3.0 wt % on a $Y_2O_3$ basis. Use of the so-formulated composition for a semiconductive ceramic capacitor, particularly, a reduction and reoxidation type one likewise causes the capacitor to be increased in capacity and dielectric strength and exhibit improved insulation resistance and D. C. breakdown voltage and good temperature characteristics.

Each of the semiconductive ceramic composition above described may be compacted into a semiconductive ceramic element and sintered to cause a surface layer of the element to be insulated.

The invention will be understood more readily with reference to the following examples, however, these examples are intended to illustrate the invention and are not to be construed to limit the scope of the invention.

EXAMPLE 1

$BaCO_3$, $TiO_2$, $Nb_2O_5$, $CeO_2$, $Co_3O_4$, $MnCO_3$ and $SiO_2$ each having an industrial grade were used as starting materials. The materials were weighed so that each composition may be obtained which has a composition ratio as shown in Table 1. The materials were subjected to wet blending in a ball mill of synthetic resin using water and pebbles for 20 hours while stirring to prepare a composition mixture. Then, the so-obtained mixture was dewatered and dried, and provisionally burned at 1200° C. for 2 hours. Subsequently, the mixture was powdered and blended for 20 hours by means of the ball mill and then dewatered and dried, to which polyvinyl alcohol (PVA) in an amount of 2 wt % was added as an organic binder to carry out granulation and grading to prepare granulated powder of the composition. The powder was then formed into a disc-like compact or semiconductive ceramic element of 10 mm in diameter and 0.5 mm in thickness at compacting pressure of about 3 tons/$cm^2$. The element was heat-treated at 800° C. for 1 hour to remove the binder therefrom and then subjected to burning at about 1300° C. for about 2 hours. Then, it was subjected to reduction at 800° C. for 2 hours in a stream of a reducing atmosphere ($H_2$ atmosphere) to prepare a reduction reoxidation type semiconductive ceramic element, which was then heat-treated at 800° C. for 2 hours in an oxidizing atmosphere (air). This caused reoxidation of only a surface of the element, resulting in the surface being provided with an insulating property. Thereafter, an Ag paste was applied onto both surfaces of the semiconductive ceramic element by printing and then baked at 800° C. to form electrodes, resulting in a reduction reoxidation type semiconductive ceramic capacitor.

A test was then carried out to consider electrical characteristics of the so-manufactured capacitor. The results were as shown in Table 1, wherein capacity and dielectric loss (tan δ) were measured at a frequency of 1 kHz and insulation resistance was measured at a room temperature of 20° C. while applying D.C. voltage of 25V to the capacitor.

TABLE 1

| | Spec-imen No. | Composition Ratio | | | | | | Electrical Characteristics | | | | | |
|---|---|---|---|---|---|---|---|---|---|---|---|---|---|
| | | mol % | | | wt % | | | $C^{*2}$ ($\mu F/cm^2$) | tan $\delta^{*3}$ (%) | $IR^{*4}$ ($M\Omega$) ($10^3$) | $Vb^{*5}$ (V) | $T.C.^{*6}$ (%) | |
| *1 | | $BaTiO_3$ | $Nb_2O_5$ | $CeO_2$ | $Co_3O_4$ | $MnCO_3$ | $SiO_2$ | | | | | −25° C. | +85° C. |
| X | 1 | 99.8 | 0.1 | 0.1 | 0 | 0 | 0 | 0.02 | 10.0 | 0.5 | 700 | 0 | −10 |
| X | 2 | 99.4 | 0.1 | 0.5 | 0 | 0 | 0 | 0.05 | 7.0 | 0.7 | 500 | +1 | −13 |
| X | 3 | 95.9 | 0.1 | 4.0 | 0 | 0 | 0 | 0.10 | 8.0 | 0.7 | 500 | +8 | −30 |
| | 4 | 99.6 | 0.2 | 0.2 | 0 | 0 | 0 | 0.15 | 4.3 | 5 | 800 | +3 | −10 |
| | 5 | 99.3 | 0.2 | 0.5 | 0 | 0 | 0 | 0.18 | 4.0 | 5 | 700 | +3 | −15 |
| | 6 | 96.8 | 0.2 | 3.0 | 0 | 0 | 0 | 0.25 | 4.3 | 7 | 1000 | −1 | −27 |
| | 7 | 99.0 | 0.5 | 0.5 | 0 | 0 | 0 | 0.27 | 3.5 | 5 | 700 | +4 | −18 |
| | 8 | 98.0 | 0.5 | 1.5 | 0 | 0 | 0 | 0.30 | 3.7 | 5 | 900 | +4 | −23 |
| | 9 | 98.5 | 1.0 | 0.5 | 0 | 0 | 0 | 0.23 | 3.5 | 5 | 700 | +4 | −19 |
| X | 10 | 98.4 | 1.5 | 0.1 | 0 | 0 | 0 | 0.05 | 11.0 | 0.7 | 500 | +5 | −13 |
| | 11 | 98.3 | 1.5 | 0.2 | 0 | 0 | 0 | 0.17 | 4.3 | 5 | 700 | +5 | −15 |
| | 12 | 98.0 | 1.5 | 0.5 | 0 | 0 | 0 | 0.20 | 4.0 | 5 | 700 | +5 | −20 |
| | 13 | 97.5 | 1.5 | 1.0 | 0 | 0 | 0 | 0.21 | 3.5 | 5 | 800 | +3 | −23 |
| | 14 | 97.0 | 1.5 | 1.5 | 0 | 0 | 0 | 0.23 | 3.7 | 5 | 700 | +1 | −25 |
| | 15 | 96.5 | 1.5 | 2.0 | 0 | 0 | 0 | 0.25 | 3.8 | 5 | 800 | 0 | −28 |
| | 16 | 95.5 | 1.5 | 3.0 | 0 | 0 | 0 | 0.26 | 4.0 | 5 | 1000 | −3 | −30 |
| X | 17 | 94.5 | 1.5 | 4.0 | 0 | 0 | 0 | 0.28 | 7.0 | 5 | 1000 | −10 | −40 |
| | 18 | 97.5 | 2.0 | 0.5 | 0 | 0 | 0 | 0.20 | 4.0 | 5 | 700 | +3 | −22 |
| | 19 | 96.5 | 2.0 | 1.5 | 0 | 0 | 0 | 0.23 | 4.0 | 5 | 800 | +4 | −26 |
| | 20 | 96.8 | 3.0 | 0.2 | 0 | 0 | 0 | 0.15 | 4.0 | 5 | 700 | +5 | −20 |
| | 21 | 96.5 | 3.0 | 0.5 | 0 | 0 | 0 | 0.15 | 4.5 | 5 | 500 | +5 | −23 |
| | 22 | 94.0 | 3.0 | 3.0 | 0 | 0 | 0 | 0.20 | 4.3 | 5 | 800 | −2 | −30 |

TABLE 1-continued

| *1 | Specimen No. | Composition Ratio | | | | | | $C^{*2}$ ($\mu F/cm^2$) | tan δ*3 (%) | IR*4 (MΩ) ($10^3$) | Vb*5 (V) | T.C.*6 (%) | |
|---|---|---|---|---|---|---|---|---|---|---|---|---|---|
| | | mol % | | | wt % | | | | | | | −25° C. | +85° C. |
| | | BaTiO$_3$ | Nb$_2$O$_5$ | CeO$_2$ | Co$_3$O$_4$ | MnCO$_3$ | SiO$_2$ | | | | | | |
| X | 23 | 95.9 | 4.0 | 0.1 | 0 | 0 | 0 | 0.05 | 12.0 | 0.5 | 300 | +13 | −25 |
| X | 24 | 95.5 | 4.0 | 0.5 | 0 | 0 | 0 | 0.07 | 8.0 | 0.7 | 300 | +7 | −30 |
| X | 25 | 92.0 | 4.0 | 4.0 | 0 | 0 | 0 | 0.05 | 8.0 | 0.5 | 300 | 0 | −45 |
| | 26 | 98.0 | 1.5 | 0.5 | 0.03 | 0 | 0 | 0.24 | 4.2 | 5 | 700 | −15 | −25 |
| | 27 | 98.0 | 1.5 | 0.5 | 0.05 | 0 | 0 | 0.23 | 4.0 | 5 | 700 | −10 | −27 |
| | 28 | 98.0 | 1.5 | 0.5 | 0.10 | 0 | 0 | 0.20 | 4.0 | 5 | 700 | 0 | −23 |
| | 29 | 98.0 | 1.5 | 0.5 | 0.20 | 0 | 0 | 0.20 | 4.0 | 5 | 700 | +5 | −20 |
| | 30 | 98.0 | 1.5 | 0.5 | 0.50 | 0 | 0 | 0.18 | 3.5 | 5 | 700 | +5 | −16 |
| | 31 | 98.0 | 1.5 | 0.5 | 0.80 | 0 | 0 | 0.14 | 3.5 | 5 | 1000 | +6 | −14 |
| X | 32 | 98.0 | 1.5 | 0.5 | 1.00 | 0 | 0 | 0.04 | 3.0 | 5 | 1000 | +5 | −10 |
| | 33 | 98.0 | 1.5 | 0.5 | 0.20 | 0.003 | 0 | 0.15 | 4.0 | 7 | 900 | +3 | −20 |
| | 34 | 98.0 | 1.5 | 0.5 | 0.20 | 0.005 | 0 | 0.20 | 3.6 | 10 | 1100 | +5 | −20 |
| | 35 | 98.0 | 1.5 | 0.5 | 0.20 | 0.03 | 0 | 0.18 | 3.5 | 20 | 1500 | +4 | −20 |
| | 36 | 98.0 | 1.5 | 0.5 | 0.20 | 0.05 | 0 | 0.20 | 3.5 | 20 | 1500 | +5 | −20 |
| | 37 | 98.0 | 1.5 | 0.5 | 0.20 | 0.10 | 0 | 0.20 | 3.3 | 20 | 1500 | +5 | −20 |
| | 38 | 98.0 | 1.5 | 0.5 | 0.20 | 0.15 | 0 | 0.15 | 3.3 | 20 | 1300 | +3 | −20 |
| | 39 | 98.0 | 1.5 | 0.5 | 0.20 | 0.25 | 0 | 0.14 | 3.0 | 10 | 1000 | +4 | −18 |
| X | 40 | 98.0 | 1.5 | 0.5 | 0.20 | 0.35 | 0 | 0.18 | 2.0 | 5 | 300 | +5 | −15 |
| | 41 | 98.0 | 1.5 | 0.5 | 0.20 | 0.05 | 0.05 | 0.20 | 3.6 | 20 | 1500 | +5 | −20 |
| | 42 | 98.0 | 1.5 | 0.5 | 0.20 | 0.05 | 0.15 | 0.17 | 3.6 | 10 | 1300 | +3 | −20 |
| | 43 | 98.0 | 1.5 | 0.5 | 0.20 | 0.05 | 0.25 | 0.14 | 4.0 | 10 | 1000 | +3 | −18 |
| X | 44 | 98.0 | 1.5 | 0.5 | 0.20 | 0.05 | 0.35 | 0.05 | 5.0 | 1 | 200 | +3 | −15 |

*1X indicates specimens which are not included in the scope of the present invention
*2C indicates capacity per unit area
*3tan δ indicates dielectric loss.
*4IR indicates insulation resistance.
*5Vb indicates D.C. breakdown voltage
*6T.C. indicates temperature characteristics.

As can be seen from Table 1, specimen Nos. 1, 2, 3, 10, 17, 23, 24, 25, 32, 40 and 44 are not included in the scope of the invention. More particularly, Table 1 indicates that Nb$_2$O$_5$ in an amount below 0.2 mol % or exceeding 3.0 mol % causes the capacitor to be decreased in unit area capacity C and increased in dielectric loss tan as well as decreased in insulation resistance IR and D.C. breakdown voltage Vb (Specimen Nos. 1, 2, 3, 23, 24 and 25). Also, it indicates that CeO$_2$ below 0.2 mol % causes the capacitor to be decreased in capacity and increased in dielectric loss; whereas when the amount of CeO$_2$ is above 3.0 mol %, the capacitor is increased in dielectric loss and exhibits improper temperature characteristics (Specimen Nos. 1, 3, 10, 17, 23 and 25). Co$_3$O$_4$ in an amount above 0.8 wt % and MnCO$_3$ above 0.25 wt % caused the capacity to be decreased (Specimen No. 32) and the D.C. breakdown voltage to be decreased (Specimen No. 40), respectively. Further, SiO$_2$ exceeding 0.25 wt % led to a decrease in capacity, insulation resistance and D.C. breakdown voltage of the capacitor (Specimen No. 44).

Thus, it will be noted that the semiconductive ceramic composition of the present invention effectively exhibits the above-noted advantages.

EXAMPLE 2

Example 1 was substantially repeated except that BaCO$_3$, TiO$_2$, Nb$_2$O$_5$, CeO$_2$, Co$_3$O$_4$, MnCO$_3$, SiO$_2$, SrCO$_3$ and Y$_2$O$_3$ in such amounts as shown in Table 2 were used as starting materials. The results were as shown in Table 2.

TABLE 2

| *1 | Specimen No. | Composition Ratio | | | | | | | | $C^{*2}$ ($\mu F/cm^2$) | tan δ*3 (%) | IR*4 (MΩ) ($10^3$) | Vb*5 (V) | T.C.*6 (%) | |
|---|---|---|---|---|---|---|---|---|---|---|---|---|---|---|---|
| | | mol % | | | wt % | | | | | | | | | −25° C. | +85° C. |
| | | BaTiO$_3$ | Nb$_2$O$_5$ | CeO$_2$ | Co$_3$O$_4$ | MnCO$_3$ | SiO$_2$ | SrTiO$_3$ | Y$_2$O$_3$ | | | | | | |
| X | 1 | 99.8 | 0.1 | 0.1 | 0 | 0 | 0 | 0 | 0 | 0.02 | 10.0 | 0.5 | 700 | 0 | −10 |
| X | 2 | 99.4 | 0.1 | 0.5 | 0 | 0 | 0 | 0 | 0 | 0.05 | 7.0 | 0.7 | 500 | +1 | −13 |
| X | 3 | 95.9 | 0.1 | 4.0 | 0 | 0 | 0 | 0 | 0 | 0.10 | 8.0 | 0.7 | 500 | +8 | −30 |
| | 4 | 99.6 | 0.2 | 0.2 | 0 | 0 | 0 | 0 | 0 | 0.15 | 4.3 | 5 | 800 | +3 | −10 |
| | 5 | 99.3 | 0.2 | 0.5 | 0 | 0 | 0 | 0 | 0 | 0.18 | 4.0 | 5 | 700 | +3 | −15 |
| | 6 | 96.8 | 0.2 | 3.0 | 0 | 0 | 0 | 0 | 0 | 0.25 | 4.3 | 7 | 1000 | −1 | −27 |
| | 7 | 99.0 | 0.5 | 0.5 | 0 | 0 | 0 | 0 | 0 | 0.27 | 3.5 | 5 | 700 | +4 | −18 |
| X | 8 | 98.4 | 1.5 | 0.1 | 0 | 0 | 0 | 0 | 0 | 0.05 | 11.0 | 0.7 | 500 | +5 | −13 |
| | 9 | 98.3 | 1.5 | 0.2 | 0 | 0 | 0 | 0 | 0 | 0.17 | 4.3 | 5 | 700 | +5 | −15 |
| | 10 | 98.0 | 1.5 | 0.5 | 0 | 0 | 0 | 0 | 0 | 0.20 | 4.0 | 5 | 700 | +5 | −20 |
| | 11 | 97.0 | 1.5 | 1.5 | 0 | 0 | 0 | 0 | 0 | 0.23 | 3.7 | 5 | 700 | +1 | −25 |
| | 12 | 95.5 | 1.5 | 3.0 | 0 | 0 | 0 | 0 | 0 | 0.26 | 4.0 | 5 | 1000 | −3 | −30 |
| X | 13 | 94.5 | 1.5 | 4.0 | 0 | 0 | 0 | 0 | 0 | 0.28 | 7.0 | 5 | 1000 | −10 | −40 |
| | 14 | 96.8 | 3.0 | 0.2 | 0 | 0 | 0 | 0 | 0 | 0.15 | 4.0 | 5 | 700 | +5 | −20 |
| | 15 | 96.5 | 3.0 | 0.5 | 0 | 0 | 0 | 0 | 0 | 0.15 | 4.5 | 5 | 500 | +5 | −23 |
| | 16 | 94.0 | 3.0 | 3.0 | 0 | 0 | 0 | 0 | 0 | 0.20 | 4.3 | 5 | 800 | −2 | −30 |
| X | 17 | 95.9 | 4.0 | 0.1 | 0 | 0 | 0 | 0 | 0 | 0.05 | 12.0 | 0.5 | 300 | +13 | −25 |
| X | 18 | 95.5 | 4.0 | 0.5 | 0 | 0 | 0 | 0 | 0 | 0.07 | 8.0 | 0.7 | 300 | +7 | −30 |
| X | 19 | 92.0 | 4.0 | 4.0 | 0 | 0 | 0 | 0 | 0 | 0.05 | 8.0 | 0.5 | 300 | 0 | −45 |
| | 20 | 98.0 | 1.5 | 0.5 | 0.03 | 0 | 0 | 0 | 0 | 0.24 | 4.2 | 5 | 700 | −15 | −25 |
| | 21 | 98.0 | 1.5 | 0.5 | 0.10 | 0 | 0 | 0 | 0 | 0.20 | 4.0 | 5 | 700 | 0 | −23 |

TABLE 2-continued

| *1 | Specimen No. | Composition Ratio mol % BaTiO3 | Nb2O5 | CeO2 | wt % Co3O4 | MnCO3 | SiO2 | SrTiO3 | Y2O3 | Electrical Characteristics C*2 (μF/cm²) | tan δ*3 (%) | IR*4 (MΩ) (10³) | Vb*5 (V) | T.C.*6 (%) −25° C. | +85° C. |
|---|---|---|---|---|---|---|---|---|---|---|---|---|---|---|---|
|   | 22 | 98.0 | 1.5 | 0.5 | 0.20 | 0 | 0 | 0 | 0 | 0.20 | 4.0 | 5 | 700 | +5 | −20 |
|   | 23 | 98.0 | 1.5 | 0.5 | 0.80 | 0 | 0 | 0 | 0 | 0.14 | 3.5 | 5 | 1000 | +6 | −14 |
| X | 24 | 98.0 | 1.5 | 0.5 | 1.00 | 0 | 0 | 0 | 0 | 0.04 | 3.0 | 5 | 1000 | +5 | −10 |
|   | 25 | 98.0 | 1.5 | 0.5 | 0.20 | 0.05 | 0 | 0 | 0 | 0.20 | 3.5 | 20 | 1500 | +5 | −20 |
|   | 26 | 98.0 | 1.5 | 0.5 | 0.20 | 0.25 | 0 | 0 | 0 | 0.14 | 3.0 | 10 | 1000 | +4 | −18 |
| X | 27 | 98.0 | 1.5 | 0.5 | 0.20 | 0.35 | 0 | 0 | 0 | 0.18 | 2.0 | 5 | 300 | +5 | −15 |
|   | 28 | 98.0 | 1.5 | 0.5 | 0.20 | 0.05 | 0.05 | 0 | 0 | 0.20 | 3.6 | 20 | 1500 | +5 | −20 |
|   | 29 | 98.0 | 1.5 | 0.5 | 0.20 | 0.05 | 0.25 | 0 | 0 | 0.14 | 4.0 | 10 | 1000 | +3 | −18 |
| X | 30 | 98.0 | 1.5 | 0.5 | 0.20 | 0.05 | 0.35 | 0 | 0 | 0.05 | 5.0 | 1 | 200 | +3 | −15 |
| X | 31 | 98.0 | 1.5 | 0.5 | 0.20 | 0.05 | 0.05 | 0.2 | 0 | 0.20 | 3.4 | 20 | 1500 | +5 | −20 |
|   | 32 | 98.0 | 1.5 | 0.5 | 0.20 | 0.05 | 0.05 | 0.5 | 0 | 0.19 | 2.5 | 20 | 1800 | +5 | −21 |
|   | 33 | 98.0 | 1.5 | 0.5 | 0.20 | 0.05 | 0.05 | 5.0 | 0 | 0.17 | 2.5 | 10 | 1500 | +8 | −23 |
|   | 34 | 98.0 | 1.5 | 0.5 | 0.20 | 0.05 | 0.05 | 10.0 | 0 | 0.14 | 2.3 | 10 | 1200 | +10 | −26 |
|   | 35 | 98.0 | 1.5 | 0.5 | 0.20 | 0.05 | 0.05 | 20.0 | 0 | 0.14 | 2.2 | 5 | 850 | +15 | −30 |
| X | 36 | 98.0 | 1.5 | 0.5 | 0.20 | 0.05 | 0.05 | 30.0 | 0 | 0.35 | 2.0 | 0.2 | 350 | −10 | −65 |
| X | 37 | 98.0 | 1.5 | 0.5 | 0.20 | 0.05 | 0.05 | 20.0 | 0 | 0.14 | 2.2 | 5 | 850 | +15 | −30 |
| X | 38 | 98.0 | 1.5 | 0.5 | 0.20 | 0.05 | 0.05 | 0 | 0.05 | 0.20 | 3.5 | 20 | 1500 | +5 | −21 |
| X | 39 | 98.0 | 1.5 | 0.5 | 0.20 | 0.05 | 0.05 | 0 | 3.0 | 0.16 | 3.3 | 10 | 2000 | +5 | −20 |
| X | 40 | 98.0 | 1.5 | 0.5 | 0.20 | 0.05 | 0.05 | 0.2 | 0.1 | 0.20 | 3.5 | 20 | 1800 | +5 | −20 |
|   | 41 | 98.0 | 1.5 | 0.5 | 0.20 | 0.05 | 0.05 | 0.5 | 0.1 | 0.20 | 2.5 | 20 | 2000 | +5 | −20 |
|   | 42 | 98.0 | 1.5 | 0.5 | 0.20 | 0.05 | 0.05 | 20.0 | 0.1 | 0.18 | 2.1 | 8 | 1400 | +10 | −26 |
| X | 43 | 98.0 | 1.5 | 0.5 | 0.20 | 0.05 | 0.05 | 30.0 | 0.1 | 0.37 | 2.2 | 0.7 | 500 | −7 | −60 |
| X | 44 | 98.0 | 1.5 | 0.5 | 0.20 | 0.05 | 0.05 | 0.2 | 3.0 | 0.18 | 3.5 | 20 | 1800 | +5 | −20 |
|   | 45 | 98.0 | 1.5 | 0.5 | 0.20 | 0.05 | 0.05 | 0.5 | 3.0 | 0.18 | 2.3 | 20 | 2000 | +3 | −21 |
|   | 46 | 98.0 | 1.5 | 0.5 | 0.20 | 0.05 | 0.05 | 20.0 | 3.0 | 0.15 | 2.1 | 10 | 1500 | +12 | −29 |
| X | 47 | 98.0 | 1.5 | 0.5 | 0.20 | 0.05 | 0.05 | 30.0 | 3.0 | 0.38 | 2.1 | 0.6 | 700 | −5 | −62 |
| X | 48 | 98.0 | 1.5 | 0.5 | 0.20 | 0.05 | 0.05 | 0.5 | 4.0 | 0.05 | 7.4 | 10 | 1600 | +6 | −15 |
| X | 49 | 98.0 | 1.5 | 0.5 | 0.20 | 0.05 | 0.05 | 30.0 | 4.0 | 0.29 | 4.2 | 0.5 | 600 | −7 | −58 |

*1 X indicates specimens which are not included in the scope of the present invention.
*2 C indicates unit area capacity
*3 tan δ indicates dielectric loss.
*4 IR indicates insulation resistance.
*5 Vb indicates D.C. breakdown voltage
*6 T.C. indicates temperature characteristics.

Table 2 indicates that $Nb_2O_5$ in an amount below 0.2 mol % or exceeding 3.0 mol % causes the capacitor to be decreased in unit area capacity C and increased in dielectric loss tan δ, as well as decreased in insulation resistance IR and D.C. breakdown voltage Vb (Specimen Nos. 1, 2, 3, 17, 18 and 19). Also, it indicates that $CeO_2$ below 0.2 mol % causes the capacitor to be decreased in capacity and increased in dielectric loss; whereas when the amount of $CeO_2$ is above 3.0 mol %, the capacitor is increased in dielectric loss and exhibits improper temperature characteristics (Specimen Nos. 1, 3, 8, 13, 17 and 19). $Co_3O_4$ in an amount above 0.8 wt % and $MnCO_3$ above 0.25 wt % caused the capacity to be decreased (Specimen No. 24) and the D.C. breakdown voltage to be decreased (Specimen No. 27). Further, $SiO_2$ exceeding 0.25 wt % led to a decrease in capacity, insulation resistance and D.C. breakdown voltage of the capacitor (Specimen No. 30).

Further, $SrTiO_3$ less than 0.5 wt % failed in a significant decrease in dielectric loss of the capacitor, whereas when $SrTiO_3$ exceeds 20.0 wt %, the capacitor failed to exhibit good temperature characteristics and was decreased in insulation resistance and D.C. breakdown voltage (Specimen Nos. 31, 36, 38, 39, 40, 43, 44, 47 and 49).

Furthermore, Table 2 indicates that $Y_2O_3$ in an amount below 0.1 wt % decreases D.C. breakdown voltage of the capacitor and $Y_2O_3$ above 3.0 wt % decreases the capacity (Specimen Nos. 37 and 48).

Thus, it will be noted that the semiconductive ceramic composition of the present invention effectively exhibits the above-noted advantages.

EXAMPLE 3

Example 1 was substantially repeated except that $BaCO_3$, $TiO_2$, $Nb_2O_5$, $CeO_2$, $Co_3O_4$, $MnCO_3$, $SiO_2$, $CaCO_3$ and $Y_2O_3$ in such amounts as shown in Table 3 were used as starting materials. The results were as shown in Table 3.

TABLE 3

| *1 | Specimen No. | Composition Ratio mol % BaTiO3 | Nb2O5 | CeO2 | wt % Co3O4 | MnCO3 | SiO2 | CaTiO3 | Y2O3 | Electrical Characteristics C*2 (μF/cm²) | tan δ*3 (%) | IR*4 (MΩ) (10³) | Vb*5 (V) | T.C.*6 (%) −25° C. | +85° C. |
|---|---|---|---|---|---|---|---|---|---|---|---|---|---|---|---|
| X | 1 | 99.8 | 0.1 | 0.1 | 0 | 0 | 0 | 0 | 0 | 0.02 | 10.0 | 0.5 | 700 | 0 | −10 |
| X | 2 | 99.4 | 0.1 | 0.5 | 0 | 0 | 0 | 0 | 0 | 0.05 | 7.0 | 0.7 | 500 | +1 | −13 |
| X | 3 | 95.9 | 0.1 | 4.0 | 0 | 0 | 0 | 0 | 0 | 0.10 | 8.0 | 0.7 | 500 | +8 | −30 |
|   | 4 | 99.6 | 0.2 | 0.2 | 0 | 0 | 0 | 0 | 0 | 0.15 | 4.3 | 5 | 800 | +3 | −10 |
|   | 5 | 99.3 | 0.2 | 0.5 | 0 | 0 | 0 | 0 | 0 | 0.18 | 4.0 | 5 | 700 | +3 | −15 |
|   | 6 | 96.8 | 0.2 | 3.0 | 0 | 0 | 0 | 0 | 0 | 0.25 | 4.3 | 7 | 1000 | −1 | −27 |
|   | 7 | 99.0 | 0.5 | 0.5 | 0 | 0 | 0 | 0 | 0 | 0.27 | 3.5 | 5 | 700 | +4 | −18 |
| X | 8 | 98.4 | 1.5 | 0.1 | 0 | 0 | 0 | 0 | 0 | 0.05 | 11.0 | 0.7 | 500 | +5 | −13 |
|   | 9 | 98.3 | 1.5 | 0.2 | 0 | 0 | 0 | 0 | 0 | 0.17 | 4.3 | 5 | 700 | +5 | −15 |
|   | 10 | 98.0 | 1.5 | 0.5 | 0 | 0 | 0 | 0 | 0 | 0.20 | 4.0 | 5 | 700 | +5 | −20 |

TABLE 3-continued

| | Specimen No. | Composition Ratio | | | | | | | | Electrical Characteristics | | | | | |
| | | mol % | | | wt % | | | | | C*2 (μF/cm²) | tan δ*3 (%) | IR*4 (MΩ) (10³) | Vb*5 (V) | T.C.*6 (%) | |
| *1 | | BaTiO₃ | Nb₂O₅ | CeO₂ | Co₃O₄ | MnCO₃ | SiO₂ | CaTiO₃ | Y₂O₃ | | | | | −25° C. | +85° C. |
|---|---|---|---|---|---|---|---|---|---|---|---|---|---|---|---|
| | 11 | 97.0 | 1.5 | 1.5 | 0 | 0 | 0 | 0 | 0 | 0.23 | 3.7 | 5 | 700 | +1 | −25 |
| | 12 | 95.5 | 1.5 | 3.0 | 0 | 0 | 0 | 0 | 0 | 0.26 | 4.0 | 5 | 1000 | −3 | −30 |
| X | 13 | 94.5 | 1.5 | 4.0 | 0 | 0 | 0 | 0 | 0 | 0.28 | 7.0 | 5 | 1000 | −10 | −40 |
| | 14 | 96.8 | 3.0 | 0.2 | 0 | 0 | 0 | 0 | 0 | 0.15 | 4.0 | 5 | 700 | +5 | −20 |
| | 15 | 96.5 | 3.0 | 0.5 | 0 | 0 | 0 | 0 | 0 | 0.15 | 4.5 | 5 | 500 | +5 | −23 |
| | 16 | 94.0 | 3.0 | 3.0 | 0 | 0 | 0 | 0 | 0 | 0.20 | 4.3 | 5 | 800 | −2 | −30 |
| X | 17 | 95.9 | 4.0 | 0.1 | 0 | 0 | 0 | 0 | 0 | 0.05 | 12.0 | 0.5 | 300 | +13 | −25 |
| X | 18 | 95.5 | 4.0 | 0.5 | 0 | 0 | 0 | 0 | 0 | 0.07 | 8.0 | 0.7 | 300 | +7 | −30 |
| X | 19 | 92.0 | 4.0 | 4.0 | 0 | 0 | 0 | 0 | 0 | 0.05 | 8.0 | 0.5 | 300 | 0 | −45 |
| | 20 | 98.0 | 1.5 | 0.5 | 0.03 | 0 | 0 | 0 | 0 | 0.24 | 4.2 | 5 | 700 | −15 | −25 |
| | 21 | 98.0 | 1.5 | 0.5 | 0.10 | 0 | 0 | 0 | 0 | 0.20 | 4.0 | 5 | 700 | 0 | −23 |
| | 22 | 98.0 | 1.5 | 0.5 | 0.20 | 0 | 0 | 0 | 0 | 0.20 | 4.0 | 5 | 700 | +5 | −20 |
| | 23 | 98.0 | 1.5 | 0.5 | 0.80 | 0 | 0 | 0 | 0 | 0.14 | 3.5 | 5 | 1000 | +6 | −14 |
| X | 24 | 98.0 | 1.5 | 0.5 | 1.00 | 0 | 0 | 0 | 0 | 0.04 | 3.0 | 5 | 1000 | +5 | −10 |
| | 25 | 98.0 | 1.5 | 0.5 | 0.20 | 0.05 | 0 | 0 | 0 | 0.20 | 3.5 | 20 | 1500 | +5 | −20 |
| | 26 | 98.0 | 1.5 | 0.5 | 0.20 | 0.25 | 0 | 0 | 0 | 0.14 | 3.0 | 10 | 1000 | +4 | −18 |
| X | 27 | 98.0 | 1.5 | 0.5 | 0.20 | 0.35 | 0 | 0 | 0 | 0.18 | 2.0 | 5 | 300 | +5 | −15 |
| | 28 | 98.0 | 1.5 | 0.5 | 0.20 | 0.05 | 0.05 | 0 | 0 | 0.20 | 3.6 | 20 | 1500 | +5 | −20 |
| | 29 | 98.0 | 1.5 | 0.5 | 0.20 | 0.05 | 0.25 | 0 | 0 | 0.14 | 4.0 | 10 | 1000 | +3 | −18 |
| X | 30 | 98.0 | 1.5 | 0.5 | 0.20 | 0.05 | 0.35 | 0 | 0 | 0.05 | 5.0 | 1 | 200 | +3 | −15 |
| X | 31 | 98.0 | 1.5 | 0.5 | 0.20 | 0.05 | 0.05 | 0.1 | 0 | 0.20 | 3.6 | 20 | 1500 | +5 | −20 |
| | 32 | 98.0 | 1.5 | 0.5 | 0.20 | 0.05 | 0.05 | 0.2 | 0 | 0.22 | 3.6 | 20 | 1900 | +1 | −17 |
| | 33 | 98.0 | 1.5 | 0.5 | 0.20 | 0.05 | 0.05 | 2.0 | 0 | 0.25 | 3.8 | 20 | 2000 | −3 | −15 |
| | 34 | 98.0 | 1.5 | 0.5 | 0.20 | 0.05 | 0.05 | 10.0 | 0 | 0.23 | 4.0 | 10 | 1800 | −15 | −5 |
| | 35 | 98.0 | 1.5 | 0.5 | 0.20 | 0.05 | 0.05 | 15.0 | 0 | 0.20 | 4.5 | 7 | 1500 | −22 | +3 |
| X | 36 | 98.0 | 1.5 | 0.5 | 0.20 | 0.05 | 0.05 | 20.0 | 0 | 0.05 | 8.0 | 5 | 1100 | −27 | +82 |
| X | 37 | 98.0 | 1.5 | 0.5 | 0.20 | 0.05 | 0.05 | 15.0 | 0 | 0.20 | 4.5 | 7 | 1500 | −22 | +3 |
| X | 38 | 98.0 | 1.5 | 0.5 | 0.20 | 0.05 | 0.05 | 0 | 0.05 | 0.20 | 3.5 | 20 | 1500 | +5 | −21 |
| X | 39 | 98.0 | 1.5 | 0.5 | 0.20 | 0.05 | 0.05 | 0 | 3.0 | 0.16 | 3.3 | 10 | 2000 | +5 | −20 |
| | 40 | 98.0 | 1.5 | 0.5 | 0.20 | 0.05 | 0.05 | 0.2 | 0.1 | 0.22 | 3.5 | 20 | 2000 | +3 | −18 |
| | 41 | 98.0 | 1.5 | 0.5 | 0.20 | 0.05 | 0.05 | 15.0 | 0.1 | 0.22 | 3.7 | 10 | 1900 | −15 | +5 |
| X | 42 | 98.0 | 1.5 | 0.5 | 0.20 | 0.05 | 0.05 | 20.0 | 0.1 | 0.08 | 6.3 | 7 | 1600 | −24 | +91 |
| X | 43 | 98.0 | 1.5 | 0.5 | 0.20 | 0.05 | 0.05 | 0.1 | 3.0 | 0.16 | 3.3 | 10 | 1700 | +5 | −21 |
| | 44 | 98.0 | 1.5 | 0.5 | 0.20 | 0.05 | 0.05 | 0.2 | 3.0 | 0.20 | 3.3 | 20 | 2000 | +3 | −19 |
| | 45 | 98.0 | 1.5 | 0.5 | 0.20 | 0.05 | 0.05 | 15.0 | 3.0 | 0.20 | 4.4 | 10 | 1800 | −20 | +2 |
| X | 46 | 98.0 | 1.5 | 0.5 | 0.20 | 0.05 | 0.05 | 20.0 | 3.0 | 0.07 | 7.1 | 7 | 1400 | −27 | +95 |
| X | 47 | 98.0 | 1.5 | 0.5 | 0.20 | 0.05 | 0.05 | 0.2 | 4.0 | 0.06 | 5.2 | 10 | 2000 | +5 | −18 |
| X | 48 | 98.0 | 1.5 | 0.5 | 0.20 | 0.05 | 0.05 | 15.0 | 4.0 | 0.05 | 4.8 | 7 | 1700 | −18 | −1 |

*1 X indicates specimens which are not included in the scope of the invention.
*2 C indicates capacity per unit area
*3 tan δ indicates dielectric loss.
*4 IR indicates insulation resistance.
*5 Vb indicates D.C. breakdown voltage
*6 T.C. indicates temperature characteristics.

Table 3 indicates that $Nb_2O_5$ in an amount below 0.2 mol % or exceeding 3.0 mol % causes the capacitor to be decreased in unit area capacity C and increased in dielectric loss tan δ, as well as decreased in insulation resistance IR and D.C. breakdown voltage Vb (Specimen Nos. 1, 2, 3, 17, 18 and 19). Also, it indicates that $CeO_2$ below 0.2 mol % causes the capacitor to be decreased in capacity and increased in dielectric loss; whereas when the amount of $CeO_2$ is above 3.0 mol %, the capacitor is increased in dielectric loss and exhibits improper temperature characteristics (Specimen Nos. 1, 3, 8, 13, 17 and 19). $Co_3O_4$ in an amount above 0.8 wt % and $MnCO_3$ above 0.25 wt % caused the capacity to be decreased (Specimen No. 24) and the D.C. breakdown voltage to be decreased (Specimen No. 27), respectively. Further, $SiO_2$ exceeding 0.25 wt % resulted in a decrease in capacity, insulation resistance and D.C. breakdown voltage of the capacitor (Specimen No. 30).

Further, $CaTiO_3$ less than 0.2 wt % failed in a significant increase in capacity and D.C. breakdown voltage of the capacitor, whereas when $CaTiO_3$ exceeds 15.0 wt %, the capacitor was decreased in capacity, increased in dielectric loss and exhibited improper temperature characteristics (Specimen Nos. 31, 35, 42 and 46).

Furthermore, Table 3 indicates that $Y_2O_3$ in an amount below 0.1 wt % fails in a significant increase of D.C. breakdown voltage of the capacitor and $Y_2O_3$ above 3.0 wt % decreases the capacity (Specimen Nos. 31, 37, 38, 39, 43, 47 and 48).

Thus, it will be noted that the semiconductive ceramic composition of the present invention effectively exhibits the above-noted advantages.

EXAMPLE 4

Example 1 was substantially repeated except that $BaCO_3$, $TiO_2$, $Nb_2O_5$, $CeO_2$, $Co_3O_4$, $MnCO_3$, $SiO_2$ and $Y_2O_3$ in such amounts as shown in Table 4 were used as starting materials. The results were as shown in Table 4.

TABLE 4

| *1 | Specimen No. | Composition Ratio mol % BaTiO₃ | Nb₂O₅ | CeO₂ | wt % Co₃O₄ | MnCO₃ | SiO₂ | Y₂O₃ | Electrical Characteristics C*² (μF/cm²) | tan δ*³ (%) | IR*⁴ (MΩ) (10³) | Vb*⁵ (V) | T.C.*⁶ (%) −25° C. | +85° C. |
|---|---|---|---|---|---|---|---|---|---|---|---|---|---|---|
| X | 1 | 99.8 | 0.1 | 0.1 | 0 | 0 | 0 | 0 | 0.02 | 10.0 | 0.5 | 700 | 0 | −10 |
| X | 2 | 99.4 | 0.1 | 0.5 | 0 | 0 | 0 | 0 | 0.05 | 7.0 | 0.7 | 500 | +1 | −13 |
| X | 3 | 95.9 | 0.1 | 4.0 | 0 | 0 | 0 | 0 | 0.10 | 8.0 | 0.7 | 500 | +8 | −30 |
|   | 4 | 99.6 | 0.2 | 0.2 | 0 | 0 | 0 | 0 | 0.15 | 4.3 | 5 | 800 | +3 | −10 |
|   | 5 | 99.3 | 0.2 | 0.5 | 0 | 0 | 0 | 0 | 0.18 | 4.0 | 5 | 700 | +3 | −15 |
|   | 6 | 96.8 | 0.2 | 3.0 | 0 | 0 | 0 | 0 | 0.25 | 4.3 | 7 | 1000 | −1 | −27 |
|   | 7 | 99.0 | 0.5 | 0.5 | 0 | 0 | 0 | 0 | 0.27 | 3.5 | 5 | 700 | +4 | −18 |
| X | 8 | 98.4 | 1.5 | 0.1 | 0 | 0 | 0 | 0 | 0.05 | 11.0 | 0.7 | 500 | +5 | −13 |
|   | 9 | 98.3 | 1.5 | 0.2 | 0 | 0 | 0 | 0 | 0.17 | 4.3 | 5 | 700 | +5 | −15 |
|   | 10 | 98.0 | 1.5 | 0.5 | 0 | 0 | 0 | 0 | 0.20 | 4.0 | 5 | 700 | +5 | −20 |
|   | 11 | 97.0 | 1.5 | 1.5 | 0 | 0 | 0 | 0 | 0.23 | 3.7 | 5 | 700 | +1 | −25 |
|   | 12 | 95.5 | 1.5 | 3.0 | 0 | 0 | 0 | 0 | 0.26 | 4.0 | 5 | 1000 | −3 | −30 |
| X | 13 | 94.5 | 1.5 | 4.0 | 0 | 0 | 0 | 0 | 0.28 | 7.0 | 5 | 1000 | −10 | −40 |
|   | 14 | 96.8 | 3.0 | 0.2 | 0 | 0 | 0 | 0 | 0.15 | 4.0 | 5 | 700 | +5 | −20 |
|   | 15 | 96.5 | 3.0 | 0.5 | 0 | 0 | 0 | 0 | 0.15 | 4.5 | 5 | 500 | +5 | −23 |
|   | 16 | 94.0 | 3.0 | 3.0 | 0 | 0 | 0 | 0 | 0.20 | 4.3 | 5 | 800 | −2 | −30 |
| X | 17 | 95.9 | 4.0 | 0.1 | 0 | 0 | 0 | 0 | 0.05 | 12.0 | 0.5 | 300 | +13 | −25 |
| X | 18 | 95.5 | 4.0 | 0.5 | 0 | 0 | 0 | 0 | 0.07 | 8.0 | 0.7 | 300 | +7 | −30 |
| X | 19 | 92.0 | 4.0 | 4.0 | 0 | 0 | 0 | 0 | 0.05 | 8.0 | 0.5 | 300 | 0 | −45 |
|   | 20 | 98.0 | 1.5 | 0.5 | 0.03 | 0 | 0 | 0 | 0.24 | 4.2 | 5 | 700 | −15 | −25 |
|   | 21 | 98.0 | 1.5 | 0.5 | 0.10 | 0 | 0 | 0 | 0.20 | 4.0 | 5 | 700 | 0 | −23 |
|   | 22 | 98.0 | 1.5 | 0.5 | 0.20 | 0 | 0 | 0 | 0.20 | 4.0 | 5 | 700 | +5 | −20 |
|   | 23 | 98.0 | 1.5 | 0.5 | 0.80 | 0 | 0 | 0 | 0.14 | 3.5 | 5 | 1000 | +6 | −14 |
| X | 24 | 98.0 | 1.5 | 0.5 | 1.00 | 0 | 0 | 0 | 0.04 | 3.0 | 5 | 1000 | +5 | −10 |
|   | 25 | 98.0 | 1.5 | 0.5 | 0.20 | 0.05 | 0 | 0 | 0.20 | 3.5 | 20 | 1500 | +5 | −20 |
|   | 26 | 98.0 | 1.5 | 0.5 | 0.20 | 0.25 | 0 | 0 | 0.14 | 3.0 | 10 | 1000 | +4 | −18 |
| X | 27 | 98.0 | 1.5 | 0.5 | 0.20 | 0.35 | 0 | 0 | 0.18 | 2.0 | 5 | 300 | +5 | −15 |
|   | 28 | 98.0 | 1.5 | 0.5 | 0.20 | 0.05 | 0.05 | 0 | 0.20 | 3.6 | 20 | 1500 | +5 | −20 |
|   | 29 | 98.0 | 1.5 | 0.5 | 0.20 | 0.05 | 0.25 | 0 | 0.14 | 4.0 | 10 | 1000 | +3 | −18 |
| X | 30 | 98.0 | 1.5 | 0.5 | 0.20 | 0.05 | 0.35 | 0 | 0.05 | 5.0 | 1 | 200 | +3 | −15 |
| X | 31 | 98.0 | 1.5 | 0.5 | 0.20 | 0.05 | 0.05 | 0.05 | 0.20 | 3.5 | 20 | 1500 | +5 | −21 |
|   | 32 | 98.0 | 1.5 | 0.5 | 0.20 | 0.05 | 0.05 | 0.10 | 0.23 | 3.5 | 20 | 2000 | +5 | −20 |
|   | 33 | 98.0 | 1.5 | 0.5 | 0.20 | 0.05 | 0.05 | 1.0 | 0.21 | 3.2 | 20 | 2000 | +3 | −23 |
|   | 34 | 98.0 | 1.5 | 0.5 | 0.20 | 0.05 | 0.05 | 3.0 | 0.16 | 3.3 | 10 | 2000 | +5 | −20 |
| X | 35 | 98.0 | 1.5 | 0.5 | 0.20 | 0.05 | 0.05 | 4.0 | 0.03 | 8.2 | 10 | 2000 | +10 | −10 |

*¹X indicates specimens which are not included in the scope of the present invention.
*²C indicates unit area capacity.
*³tan δ indicates dielectric loss.
*⁴IR indicates insulation resistance.
*⁵Vb indicates D.C. breakdown voltage
*⁶T.C. indicates temperature characteristics.

Table 4 indicates that $Nb_2O_5$ in an amount below 0.2 mol % or exceeding 3.0 mol % causes the capacitor to be decreased in unit area capacity C and increased in dielectric loss tan δ, as well as decreased in insulation resistance IR and D.C. breakdown voltage Vb (Specimen Nos. 1, 2, 3, 17, 18 and 19). Also, it indicates the $CeO_2$ below 0.2 mol % causes the capacitor to be decreased in capacity and increased in dielectric loss; whereas when the amount of $CeO_2$ is above 3.0 mol %, the capacitor is increased in dielectric loss and exhibits improper temperature characteristics (Specimen Nos. 1, 3, 8, 13, 17 and 19). $Co_3O_4$ in an amount above 0.8 wt % and $MnCO_3$ above 0.25 wt % caused the capacity to be decreased (Specimen No. 24) and the D.C. breakdown voltage to be decreased (Specimen No. 27). Further, $SiO_2$ exceeding 0.25 wt % led to a decrease in capacity, insulation resistance and D.C. breakdown voltage of the capacitor (Specimen N. 30).

Furthermore, Table 4 indicates that $Y_2O_3$ in an amount below 0.1 wt % fails in a significant increase of D.C. breakdown voltage of the capacitor and $Y_2O_3$ above 3.0 wt % decreases the capacity and increases the dielectric loss (Specimen Nos. 31 and 35).

Thus, it will be noted that the semiconductive ceramic composition of the present invention effectively exhibits the above-noted advantages.

While the invention has been described with a certain degree of particularity with reference to the examples, obvious modifications and variations are possible in the light of the above teachings. It is therefore to be understood that within the scope of the appended claims, the invention may be practiced otherwise than as specifically described.

What is claimed is:

1. A semiconductive ceramic composition consisting essentially of 99.6 to 94.4 wt. % $BaTiO_3$, 0.24 to 3.4 wt. % of $Nb_2O_5$, and 0.15 to 2.2 wt. % $CeO_2$, and, based on the total amount of $BaTiO_3$, $Nb_2O_5$ and $CeO_2$, 0.3 to 0.8 wt. % $Co_3O_4$ and 0.003 to 0.25 wt. % $MnCO_3$.

2. The semiconductive ceramic composition of claim 1 which is compacted and sintered to cause a surface layer thereof to be insulated.

3. A semiconductive ceramic composition consisting essentially of 99.6 to 94.4 wt. % $BaTiO_3$, 0.25 to 3.4 wt. % of $Nb_2O_5$, and 0.15 to 2.2 wt. % $CeO_2$, and, based on the total amount of $BaTiO_3$, $Nb_2O_5$ and $CeO_2$, 0.3 to 0.8 wt. % $Co_3O_4$, 0.003 to 0.25 wt. % $MnCO_3$ and 0.05 to 0.25 wt. % $SiO_2$.

4. The semiconductive ceramic composition of claim 3 which is compacted and sintered to cause a surface layer thereof to be insulated.

5. A semiconductive ceramic composition consisting essentially of 99.6 to 94.4 wt. % $BaTiO_3$, 0.25 to 3.4 wt. % of $Nb_2O_5$, and 0.15 to 2.2 wt. % $CeO_2$, and, based on the total amount of $BaTiO_3$, $Nb_2O_5$ and $CeO_2$, 0.3 to 0.8 wt. % $Co_3O_4$, 0.003 to 0.25 wt. % $MnCO_3$, 0.05 to 0.25 wt. % $SiO_2$, and 0.5 to 20.0 wt. % $SrTiO_3$.

6. The semiconductive ceramic composition of claim 5 which is compacted and sintered to cause a surface layer thereof to be insulated.

7. A semiconductive ceramic composition consisting essentially of 99.6 to 94.4 wt. % $BaTiO_3$, 0.25 to 3.4 wt.5 of $Nb_2O_5$, and 0.15 to 2.2 wt. % $CeO_2$, and, based on the total amount of $BaTiO_3$, $Nb_2O_5$ and $CeO_2$, 0.3 to 0.8 wt. % $Co_3O_4$, 0.003 to 0.25 wt. % $MnCO_3$, 0.05 to 0.25 wt. % $SiO_2$, 0.5 to 20.0 wt. % $SrTiO_3$, and 0.1 to 3.0 wt. % $Y_2O_3$.

8. The semiconductive ceramic composition of claim 7 which is compacted and sintered to cause a surface layer thereof to be insulated.

9. A semiconductive ceramic composition consisting essentially of 99.6 to 84.4 wt. % $BaTiO_3$, 0.25 to 3.5 wt. % of $Nb_2O_5$, and 0.15 to 2.2 wt. % $CeO_2$, and, based on the total amount of $BatiO_3$, $Nb_2O_5$ and $CeO_2$, 0.3 to 0.8 wt. % $Co_3O_4$, 0.003 to 0.25 wt. % $MnCO_3$, 0.05 to 0.25 wt. % $SiO_2$, and 0.2 to 15.0 wt. % $CaTiO_3$.

10. The semiconductive ceramic composition of claim 9 which is compacted and sintered to cause a surface layer thereof to be insulated.

11. A semiconductive ceramic composition consisting essentially of 99.6 to 94.4 wt. % $BaTiO_3$, 0.25 to 3.4 wt. % of $Nb_2O_5$, and 0.15 to 2.2 wt. % $CeO_2$, and, based on the total amount of $BaTiO_3$, $Nb_2O_5$ and $CeO_2$, 0.3 to 0.8 wt. % $Co_3O_4$, 0.003 to 0.25 wt. % $MnCO_3$, 0.05 to 0.25 wt. % $SiO_2$, 0.2 to 15.0 wt. % $CaTiO_3$, and 0.1 to 3.0 wt. % $Y_2O_3$.

12. The semiconductive ceramic composition of claim 11 which is compacted and sintered to cause a surface layer thereof to be insulated.

13. A semiconductive ceramic composition consisting essentially of 99.6 to 94.4 wt. % $BaTiO_3$, 0.25 to 3.4 wt. % of $Nb_3O_5$ and 0.15 to 2.2 wt. % $CeO_2$, and, based on the total amount of $BaTiO_3$, $Nb_2O_5$ and $CeO_2$, 0.3 to 0.8 wt. % $Co_3O_4$, 0.003 to 0.25 wt. % $MnCO_3$, 0.05 to 0.25 wt. % $SiO_2$, and 0.1 to 3.0 wt. % $Y_2O_3$.

14. The semiconductive ceramic composition of claim 13 which is compacted and sintered to cause a surface layer thereof to be insulated.

* * * * *